Patented Nov. 11, 1952

2,617,828

UNITED STATES PATENT OFFICE 2,617,828

7-KETO-4b-METHYL-1,2,3,4,4a,4b,5,6,7,9,10,10a-DODECAHYDROPHENANTHRENE-1,4-DIOL AND ITS PREPARATION

Lewis H. Sarett, Princeton, and Roger E. Beyler, Metuchen, N. J., assignors to Merck & Co., Inc., Rahway, N. J., a corporation of New Jersey No Drawing. Application May 24, 1951, Serial No. 228,126

6 Claims. (Cl. 260—586)

This invention is concerned generally with polyhydrophenanthrene compounds and with processes for preparing them. More particularly, it relates to the novel compound 7-keto-4b-methyl-1,2,3,4,4a,4b,5,6,7,9,10,10a - dodecahydrophenanthrene-1,4-diol, and with the novel process of preparing this compound starting with 5-methyl-6-keto-perhydronaphthalene-1,4-diol.

The new compound, 7-keto-4b-methyl-1,2,3,4,-4a,4b,5,6,7,9,10,10a - dodecahydrophenanthrene-1,4-diol, may be chemically represented as follows:

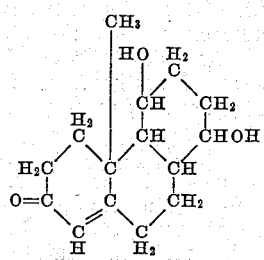

This compound possesses the ABC ring system characteristic of certain members of the steroid group of compounds, and also possesses the angular 4b-methyl grouping (corresponding to position 10 according to conventional steroid nomenclature) together with the proper functional substitution in ring C characteristic of adrenal hormones such as cortisone, Compound F and corticosterone. 7-keto-4b-methyl-1,2,3,4,4a,4b,5,6,-7,9,10,10a-dodecahydrophenanthrene-1,4-diol is capable of further elaboration to a steroid member and is of value in the total synthesis of steroid hormones.

The 7-keto-4b-methyl-1,2,3,4,4a,4b,5,6,7,9,10,-10a-dodecahydrophenanthrene-1,4-diol, subject of the present invention, can be prepared by bringing into intimate contact, in the presence of an alkaline condensation agent, 5-methyl-6-keto-perhydronaphthalene-1,4-diol (Compound 1 hereinbelow) and methyl vinyl ketone, thereby producing said 7-keto-4b-methyl-1,2,3,4,4a,4b,5,-6,7,9,10,10a-dodecahydrophenanthrene - 1,4 - diol (Compound 2).

This reaction may be chemically represented as follows:

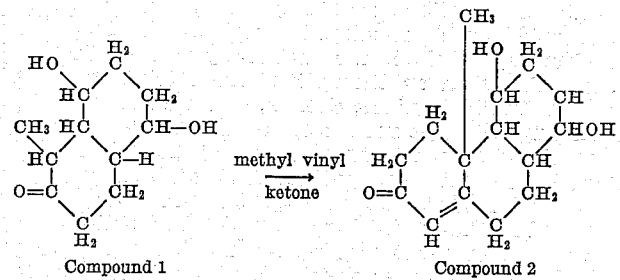

Compound 1    Compound 2

The 5 - methyl-6-keto-perhydronaphthalene-1,4-diol, employed as a starting material in this novel process, is a new compound which may be prepared according to the following procedure β-ethoxy-propionaldehyde is reacted with ethyl magnesium bromide to produce 1-ethoxy-3-hydroxy-pentane which is reacted with chromic acid thereby oxidizing the hydroxy substituent to form 1-ethoxy-3-keto-pentane; the latter compound is treated with ethyl orthoformate and ethanol in the presence of hydrogen chloride to produce 1,3,3-triethoxy-pentane which, upon reaction with hot potassium bisulfate, is converted to 3-ethoxy-1,3-pentadiene. The 3-ethoxy-1,3-pentadiene is then reacted with benzoquinone in accordance wtih the Diels-Alder condensation procedure to produce 5-methyl-6-ethoxy-1,4,4a,-5,8,8a-hexahydronapthalene-1,4-dione which is then reacted with hydrogen in the presence of Raney nickel catalyst to form 5-methyl-6-ethoxy-1,2,3,4,4a,5,8,8a-octahydronaphthalene - 1,4-dione; the latter compound is reacted with lithium aluminum hydride to form the corresponding diol, 5-methyl-6-ethoxy-1,2,3,4,4a,5,8,8a-octahydronapthalene-1,4-diol which is reacted with a hydrolyzing agent to produce 5-methyl-6-keto-perhydronaphthalene-1,4-diol. The reactions indicated above are described in detail in a copending application of one of the present applicants, Serial No. 216,109, filed March 16, 1951.

In accordance with the present invention, the 5-methyl-6-keto-perhydronaphthene - 1,4 - diol is brought into intimate contact, in an alkaline reaction medium, with methyl vinyl ketone to produce 7-keto-4b-methyl-1,2,3,4,4a,4b,5,6,7,9,10,-10a-dodecahydrophenanthrene-1,4-diol. If desired, methyl vinyl ketone per se can be incorporated in the reaction medium. However, it is alternatively possible to bring together, in the alkaline medium, the 5-methyl-6-keto-perhydronaphthalene-1,4-diol and a methyl β-substituted-ethyl ketone compound characterized as being decomposed by alkaline media with the formation of methyl vinyl ketone. Amongst the methyl β-substituted-ethyl ketone compounds which we ordinarily utilize, in the alkaline medium, for generating methyl vinyl ketone, in situ, are those which may be chemically represented by the following structural formula: $CH_3COCH_2CH_2Z$, wherein the radical Z may be $R_2N—$, $RS—$, $RSO—$, $RSO_2—$, $RO—$ or X, the radical R being an alkyl or aryl substituent, and X being a halo radical. We prefer to utilize the tertiary amines, $CH_3COCH_2CH_2NR_2$, wherein R has the significance hereinabove defined, and quaternary salts thereof, and particularly the N-(3-keto-butyl)-N,N,N-trialkylammonium halides such as N-(3-keto-butyl)-N,N-diethyl-N-methyl-ammonium iodide, and the like.

As set forth hereinabove the process is carried out in the presence of an alkaline condensation agent which catalyzes the reaction. Any strong base can be utilized, for example an alkali metal hydroxide, such as sodium hydroxide, potassium hydroxide, and the like, a quaternary ammonium hydroxide such as Triton B (benzyl trimethyl ammonium hydroxide), choline, and the like, an alkali metal amide such as sodamide, or a metal-organic base such as an alkali metal alcoholate, and the like. The proportion of base utilized is not critical since the reaction has been found to proceed normally utilizing an amount of alkaline condensation agent varying from one-tenth of an equivalent to four or more equivalents based on the 5-methyl-6-keto-perhydronaphthalene-1,4-diol.

We ordinarily utilize, as the medium for the reaction, a polar liquid, for example, water, a lower aliphatic alcohol such as methanol, ethanol, isopropanol, and the like, an ether such as diethyl ether, tetrahydrofuran, and the like, or a mixture of two or more miscible polar liquids. The quantity of polar liquid utilized has no effect on whether or not the reaction will go, although we prefer to utilize an amount of solvent equal to about ten times the weight of the reactants.

As set forth hereinabove, the methyl vinyl ketone can be provided in the reaction medium either by adding methyl vinyl ketone per se, or by adding a methyl β-substituted-ethyl ketone compound, such as diethyl-(3-keto-butyl)-methyl-ammonium iodide, characterized as being decomposed by alkaline media with the formation of methyl vinyl ketone. The relative amount of methyl vinyl ketone or methyl β-substituted-ethyl ketone compound is likewise not critical since the condensation proceeds satisfactorily utilizing an amount of one of these compounds ranging from one equivalent based on the 5-methyl-6-keto-perhydronaphthalene-1,4-diol to four equivalents or more. In carrying out the reaction, the 5-methyl-6-keto-perhydronaphthalene-1,4-diol, the polar liquid, the alkaline condensation agent, and either methyl vinyl ketone or methyl β-substituted ethyl ketone compound, are placed together, and the resulting mixture is heated for a period ranging from approximately one-half to twenty-four hours.

The 7-keto-4b-methyl-1,2,3,4,4a,4b,5,6,7,9,10,10a-dodecahydrophenanthrene-1,4-diol thus produced is conveniently recovered from the reaction mixture by acidifying the mixture with an aqueous solution of a mineral acid, and extracting the aqueous acidic reaction mixture with a water-immiscible organic solvent whereby the 7-keto-4b-methyl-1,2,3,4,4a,4b,5,6,7,9,10,10a - dodecahydrophenanthrene-1,4-diol is transferred to the non-aqueous layer, while leaving in the aqueous layer the inorganic constituents and water-soluble amine by-products. The 7-keto-4b-methyl-1,2,3,4,4a,4b,5,6,7,9,10,10a - dodecahydrophenanthrene-1,4-diol is recovered from the non-aqueous extract by evaporating the solvent, and can be purified, if desired, by conventional means.

The following examples illustrate methods of carrying out the present invention, but it is to be understood that these examples are given for purposes of illustration and not of limitation.

*Example 1*

Ten cubic centimeters of absolute ethanol, 1.148 g. of 5-methyl-6-keto-perhydronaphthalene-1,4-diol (0.00578 mole), 2.4 cc. of a 40% aqueous solution of Triton B (0.00575 mole) and 1 cc. of an 85% aqueous solution of methyl vinyl ketone (0.012 mole) were mixed together, and the resulting mixture was heated under reflux for a period of approximately two hours. At the end of this period, 10 cc. of water were added to the mixture, and the resulting mixture was heated under reflux for several minutes. The ethanol was evaporated from the reaction mixture, and the normality of the residual aqueous solution was adjusted to about 1 by the addition of hydrochloric acid. The acidified solution was heated on a steam bath for a period of about five to ten minutes, cooled and extracted with chloroform. The chloroform extract was then evaporated to dryness to produce crude 7-keto-4b-methyl-1,2,3,4,4a,4b,5,6,7,9,10,10a - dodecahydrophenanthrene-1,4-diol. This compound was purified by recrystallization from ethanol to give substantially pure 7-keto-4b-methyl-1,2,3,4,4a,4b, 5,6,7,9,10,10a-dodecahydrophenanthrene-1,4-diol; M. P. 246° C.

*Example 2*

Fifteen and two-tenths grams of 5-methyl-6-keto-perhydronaphthalene-1,4-diol (0.0767 mole), 130 cc. of absolute ethanol, 5 cc. of a 40% aqueous solution of Triton B (0.012 mole), and 13 cc. of an 85% aqueous solution of methyl vinyl ketone (0.158 mole) were mixed together, and the mixture was heated under reflux for a period of approximately two hours. At the end of this period, one-half of the ethanol was evaporated from the reaction mixture, and 50 cc. of water was added to the residual solution. The resulting aqueous solution was then heated under reflux for a period of approximately five to ten minutes, at the end of which time the remainder of the ethanol was evaporated. The normality of the residual aqueous solution was adjusted to about 1 by the addition of hydrochloric acid. The acidified solution was heated on a steam bath for a period of about five to ten minutes, cooled, and extracted with chloroform. The chloroform extract was evaporated to dryness, and the residual material was purified by recrystallization from ethanol to give substantially pure 7-keto-4b-methyl-1,2,3,4,4a,4b,5,6,7,9, 10,10a-dodecahydrophenanthrene-1,4-diol; M. P. 246° C.

*Example 3*

One gram of 5-methyl-6-keto-perhydronaphthalene-1,4-diol (0.00505 mole), 9 cc. of absolute tetrahydrofuran, 0.1687 g. of Triton B (0.001 mole) and 2.879 g. of methyl vinyl ketone (0.041 mole) were mixed together, and the mixture was heated under reflux in an atmosphere of nitrogen for a period of approximately one hour. At the end of this period, 9 cc. of water was added to the reaction mixture, and the tetrahydrofuran was evaporated from the aqueous mixture thus obtained. The normality of the resulting aqueous solution was adjusted to about 1 by the addition of hydrochloric acid. The acidified solution was heated on a steam bath for a period of about ten minutes, cooled and extracted with chloroform. The chloroform extract was evaporated to dryness, and the residual material was purified by recrystallization from ethanol to give substantially pure 7-keto-4b-methyl-1,2,3,4,4a,4b,5,6,7,9,10,10a - dodecahydrophenanthrene-1,4-diol; M. P. 246° C.

Example 4

Seven-tenths of a gram of 5-methyl-6-ketoperhydronaphthalene-1,4-diol (0.00352 mole), 7 cc. of water, 0.14 g. of an 85% aqueous solution of potassium hydroxide (0.00214 mole), 0.6 cc. of an 85% aqueous solution of methyl vinyl ketone (0.0071 mole), and 0.3 cc. of a 40% aqueous solution of Triton B (0.0007 mole) were mixed together, and the mixture was heated under reflux for a period of approximately one hour. At the end of this period, the normality of the reaction solution was adjusted to approximately 1 by the addition of hydrochloric acid, and the acidified solution was heated on a steam bath for a period of about fifteen minutes. The resulting solution was cooled, and extracted with chloroform. The chloroform extract was evaporated to dryness, and the residual material was purified by recrystallization from ethanol to give substantially pure 7-keto-4b-methyl - 1,2,3,4,4a,4b,5,6,7,9,10,10a - dodecahydrophenanthrene-1,4-diol; M. P. 246° C.

Example 5

Ten cubic centimeters of water, 1.086 g. of 5 - methyl - 6 - keto - perhydronaphthalene-1,4-diol (0.00548 mole), 0.852 g. of an 85% aqueous solution of potassium hydroxide (0.0129 mole), 3.072 g. of diethyl-(3-keto-butyl)-methylammonium iodide (0.01078 mole), and 0.5 cc. of a 40% aqueous solution of Triton B (0.0012 mole) were mixed together, and the resulting mixture was heated under reflux for a period of approximately two and one-half hours. At the end of this period, the normality of the reaction solution was adjusted to approximately 1 by the addition of hydrochloric acid, the acidified solution was heated on a steam bath for a period of about fifteen minutes, and the resulting solution was cooled and extracted with chloroform. The chloroform extract was evaporated to dryness, and the residual material was purified by recrystallization from ethanol to give substantially pure 7-keto-4b-methyl-1,2,3,4,4a,4b,5,6,7,9,10,10a - dodecahydrophenanthrene - 1,4 - diol; M. P. 246° C.

Example 6

One gram of 5-methyl-6-keto-perhydronaphthalene-1,4-diol (0.00505 mole), 12 cc. of water, 1.33 g. of an 85% aqueous solution of potassium hydroxide (0.0202 mole), and 3.9817 g. of diethyl-(3-keto-butyl)-methyl-ammonium iodide (0.01398 mole) were mixed together, and the mixture was heated under reflux for a period of approximately two hours. At the end of this period, the normality of the reaction solution was adjusted to approximately 1 by the addition of hydrochloric acid, the acidified solution was heated on a steam bath for a period of five minutes and the resulting mixture was cooled and extracted with chloroform. The chloroform extract was evaporated to dryness, and the residual material was purified by recrystallization from ethanol to give substantially pure 7-keto-4b - methyl - 1,2,3,4,4a,4b,5,6,7,9,10,10a - dodecahydrophenanthrene-1,4-diol; M. P. 246° C.

Example 7

Five-tenths of a gram of 5-methyl-6-ketoperhydronaphthalene-1,4-diol (0.00252 mole), 0.784 g. of diethyl-(3-keto-butyl)-methyl-ammonium iodide (0.00274 mole), 3 cc. of absolute ethanol, 3 cc. of water, and 0.495 g. of an 85% aqueous solution of potassium hydroxide (0.0075 mole) were mixed together, and the resulting mixture was heated under reflux for a period of one hour. At the end of this period, the ethanol was evaporated from the reaction mixture, and the normality of the resulting solution was adjusted to approximately 1 by the addition of hydrochloric acid. The acidified solution was heated on the steam bath for a period of about five to ten minutes, cooled and extracted with chloroform. The chloroform extract was evaporated to dryness, and the residual material was purified by recrystallization from ethanol to give substantially pure 7-keto-4b-methyl-1,2,3,4,4a,4b,5,6,7,9,10,10a - dodecahydrophenanthrene-1,4-diol; M. P. 246° C.

Example 8

Five cubic centimeters of water, 0.992 g. of 5-methyl-6-keto-perhydronaphthalene-1,4 - diol (0.0050 mole), 0.7 cc. of a 40% aqueous solution of Triton B (0.001678 mole) and 0.9 cc. of an 85% aqueous solution of methyl vinyl ketone (0.0108 mole) were mixed together, and the resulting mixture was heated under reflux for a period of approximately one and one-half hours. At the end of this period, the normality of the reaction solution was adjusted to approximately 1 by the addition of hydrochloric acid, and the acidified solution was heated on the steam bath for a period of about fifteen minutes. The resulting solution was cooled and extracted with chloroform. The chloroform extract was evaporated to dryness, and the residual material was purified by recrystallization from ethanol to give substantially pure 7-keto-4b-methyl-1,2,3,4,4a,4b,5,6,7,9,10,10a-dodecahydrophenanthrene - 1,4-diol; M. P. 246° C.

Example 9

Ten cubic centimeters of absolute ethanol, 1.162 g. of 5-methyl-6-keto-perhydronapthalene-1,4-diol (0.00586 mole), 1.3 cc. of a 50% aqueous solution of choline containing 0.71 g. of choline (0.00586 mole) and 1.45 cc. of an 85% aqueous solution of methyl vinyl ketone (0.0176 mole) were mixed together, and the resulting mixture was heated under reflux for a period of approximately two hours. At the end of this period 10 cc. of water was added to the reaction mixture, and the resulting mixture was heated under reflux for several minutes. The ethanol was then evaporated from the reaction mixture, and the normality of the residual solution was adjusted to approximately 1 by the addition of hydrochloric acid. The acidified solution was heated on a steam bath for a period of about five to ten minutes, cooled and extracted with chloroform. The chloroform extract was evaporated to dryness, and the residual material was purified by recrystallization from ethanol to give substantially pure 7-keto-4b-methyl-1,2,3,4,4a,4b,5,6,7,9,10,10a - dodecahydrophenantherene-1,4-diol; M. P. 246° C.

Various changes and modifications may be made in carrying out the present invention without departing from the spirit and scope thereof. Insofar as these changes and modifications are within the purview of the annexed claims, they are to be considered as part of our invention.

We claim:

1. 7-keto-4b-methyl-1,2,3,4,4a,4b,5,6,7,9,10,10a-dodecahydrophenanthrene-1,4-diol.

2. The process of preparing 7-keto-4b-methyl-1,2,3,4,4a,4b,5,6,7,9,10,10a - dodecahydrophenanthrene-1,4-diol which comprises bringing into intimate contact, in an alkaline reaction medium, 5-methyl-6-keto-perhydronaphthalene-1,4 - diol and methyl vinyl ketone.

3. The process which comprises bringing together, in an alkaline reaction medium, 5-methyl-6-keto-perhydronaphthalene - 1,4 - diol and a methyl β-substituted-ethyl ketone compound characterized as being decomposed by alkaline media with the formation of methyl vinyl ketone, thereby producing 7-keto-4b-methyl-1,2,3,4,4a,4b,5,6,7,9,10,10a - dodecahydrophenanthrene-1,4-diol.

4. The process which comprises bringing into intimate contact, in a liquid medium containing a strong base, 5-methyl-6-keto-perhydronaphthalene-1,4-diol and methyl vinyl ketone, and heating the mixture thus formed thereby producing 7-keto-4b-methyl-1,2,3,4,4a,4b,5,6,7,9,10,10a-dodecahydrophenanthrene-1,4-diol.

5. The process which comprises reacting 5-methyl-6-keto - perhydronaphthalene - 1,4 - diol with methyl vinyl ketone, said reaction being carried out by heating the reactants together in an aqueous solution containing a quaternary ammonium hydroxide, thereby producing 7-keto-4b-methyl - 1,2,3,4,4a,4b,5,6,7,9,10,10a-dodecahydrophenanthrene-1,4-diol.

6. The process which comprises reacting 5-methyl-6-keto - perhydronaphthalene - 1,4 - diol with N-(3-keto-butyl)-N,N-diethyl - N - methylammonium iodide, said reaction being carried out by heating the reactants together in an aqueous solution containing an alkali metal hydroxide, thereby producing 7-keto-4b-methyl-1,2,3,4,4a,4b,5,6,7,9,10,10a-dodecahydrophenanthrene - 1,4-diol.

LEWIS H. SARETT.
ROGER E. BEYLER.

No references cited.